Feb. 2, 1932.  W. A. DOBSON  1,843,416
TYPEWRITING MACHINE
Filed Sept. 14, 1929
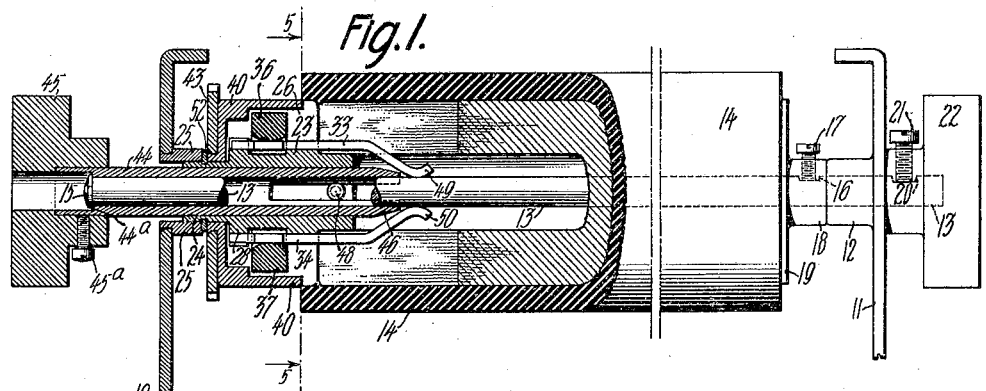
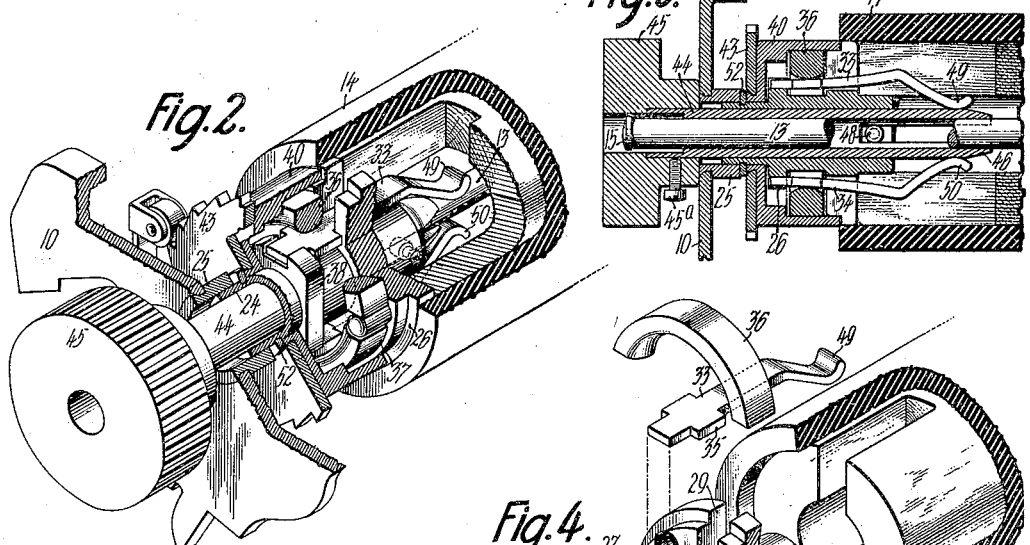
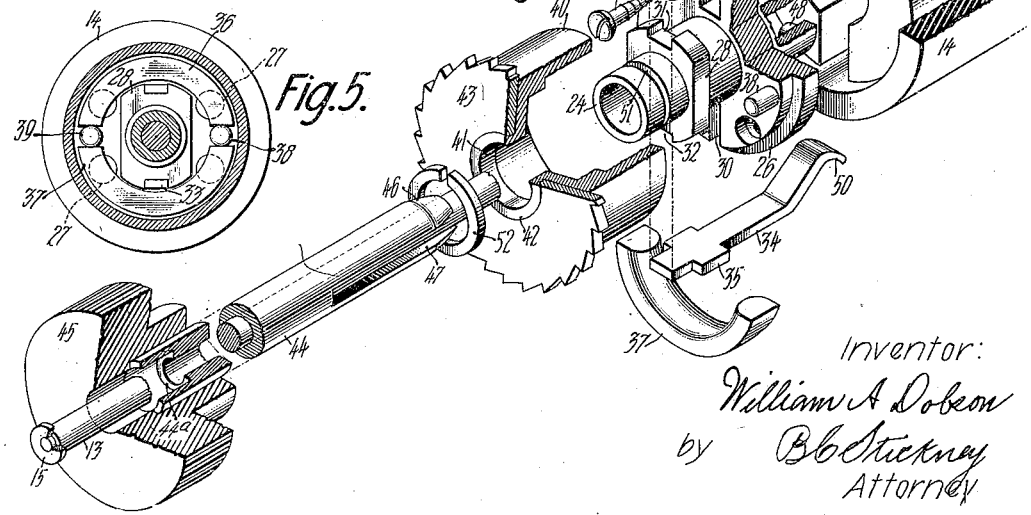
Inventor:
William A Dobson
by B C Stickney
Attorney Patented Feb. 2, 1932

1,843,416

UNITED STATES PATENT OFFICE

WILLIAM A. DOBSON, OF BRIDGEPORT, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed September 14, 1929. Serial No. 392,519.

This invention relates to means for releasing the platen from the control of the line-space wheel of a typewriting machine, to permit independent rotation of the platen.

An object of the invention is to devise a practicable platen-releasing mechanism for use especially in portable typewriters, in which space is seriously limited, and in which the parts must be made very light, and in which weakness and complication must be avoided, and the cost must be very low.

The portable typewriter includes a carrying-case which must close down over the entire machine, including the carriage, and therefore the length of the carriage is limited, and it is thereby rendered impracticable to employ many of the old forms of platen-releases because they extend considerably from the end of the carriage.

To meet the conditions in portable typewriters, the invention provides clutch-members in the form of cylindrical segments, which are expanded outwardly against the inner side of a brake-drum, which is fixed to the platen. The latter remains in the same place and has the same length that is usual in Underwood portable machines, and the line-space wheel occupies its usual position in said machines; said novel brake-drum occupying a position between the line-space wheel and the platen, and being fixed to the line-space wheel. To satisfy the requirement of simplicity, the brake-shoes are expanded by means of simple levers, which are simply mounted, and their free ends extend within the platen, whereby the brake-setting mechanism is fitted without occupying any space outside of the platen or carriage. By thrusting in the left-hand platen-knob, the levers are caused to expand the brake segments or shoes, and thereby clutch the platen to the line-space wheel. Releasing is effected by pulling out the platen-knob.

When designing a platen-releasing clutch-mechanism, a good end bearing has not heretofore been obtained, due to the end knob being slidable and to the attempt to support the clutch-mechanism by the sliding member, so that a perfect operating clutch was not obtained.

A feature of the present invention is to construct an extension which forms a solid end bearing in the end plate of the platen-frame, while the sliding member is supported in the extension. In this manner, whether the clutch is in effective or ineffective position, the platen and other mechanism is always rigidly supported at its end, and looseness and play are eliminated.

Another feature resides in the provision for easy assembly of the mechanism, which is so constructed that the parts may be merely placed in position without resorting to connecting springs or screws, so that after said parts are assembled the cap is merely placed thereon and a spring washer fixed in position to retain the clutch-mechanism.

Still another feature is extreme leverage that is obtained to make the clamping jaws very effective. Opposite levers are used, and the coned end of a slidable sleeve on the platen-knob cams said levers apart, which in turn spread the clamping jaws or shoes and clamp the ratchet-wheel rigidly to the platen. Said clamping jaws consist of two semi-annular segments, and the spreading levers operate upon their central portions. The shoes are made of rigid material so that the pressure will be even all around the clamping surface.

Other features and advantages will hereinafter appear.

In the accompanying drawings,

Figure 1 is a front view, partly in section, of a platen and its supports, and shows the present invention applied thereto, with the parts in their released or ineffective positions.

Figure 2 is a perspective view of the invention with some of the parts broken away for clearness.

Figure 3 is a similar view to Figure 1, but shows the parts of the invention in their effective positions.

Figure 4 is a perspective view of the invention with the parts disassembled.

Figure 5 is a sectional side view taken on line 5—5 of Figure 1.

Referring to the drawings, 10 and 11 are the end frames of a typewriter-carriage. The frame 11 has a bearing 12 which fits a platen-shaft 13 for a platen 14. This shaft is a straight rod with a head 15 swedged on one end, and is slightly flattened at 16 near the other end to act as a seat for a set-screw 17, which is threaded in the collar 18 made rigid with the platen-end disk 19. Still closer to the end of the shaft 13 is another flattened seat 20 to be engaged by a set-screw 21 in the hand-wheel 22 at the right-hand end of the platen. The part of the shaft between the disk 19 and the hand-wheel 22 acts as a journal for the platen.

At the other end of the platen 14 is a hollow stud or sleeve 23 which at its extreme end 24 is fitted into a bearing 25 of the end frame 10. This sleeve 23 is in effect a tubular shaft for the platen 14, as it has integral therewith or rigidly attached thereto a disk or flange 26 of just the size to fit the end of the platen 14. This disk is secured thereto by four wood-screws 27 and is fixed in concentric relation thereto.

Attached to or integral with this tubular shaft 23 is another disk 28, which is substantially circular but flattened on two sides so as to allow for the heads of the screws 27 to pass when securing the flange 26 to the end of the platen 14.

Slots 29 and 30 are cut through the disk 26 and in line therewith are cut slots 31 and 32 in the disk 28. These slots 29 and 31 act as seats for the flat spring 33, while the slots 30 and 32, diametrically opposite, act as seats for a similar spring 34.

These springs 33 and 34 are substantially rectangular in section with a part 35 a little wider than elsewhere along their length for the purpose of making a good seat for annular sectional shoes 36 and 37.

Pins 38 and 39 are riveted at diametrically opposite points of the disk 26 and made to extend out between the ends of the annular sectional shoes 36 and 37. This keeps the shoes from rotating on the shaft when thrown into engagement with the drum 40. This drum 40 is made cup shaped to fit over the parts just described. It has a central opening 41 which fits neatly over the end 24 of the hollow shaft 23. This drum is also formed with a boss or hub 42 which is used to secure concentric therewith a line-space wheel 43.

Through the hollow shaft 23 is passed a sleeve 44, which neatly fits into the same but permits rotation therein. The inside of the sleeve loosely fits the platen-shaft 13. At its outer end this sleeve is countersunk at 44ᵃ to take the head 15 of the shaft 13. There is also fastened to the sleeve, by means of a set-screw 45ᵃ, a knob or hand-wheel 45.

At the opposite end of the sleeve 44 is an annular wedge 46. Longitudinal of the sleeve is a slot 47 of a width to freely slide over a pin 48, which is riveted in the hollow shaft 23 and extends inwardly a little less than the thickness of the sleeve 44.

The inner ends 49 and 50 of the springs 33 and 34 are bent downwardly just to lightly touch the platen-shaft 13, and at the extreme ends are flared slightly outward so as not to bind when the sleeve 44 is moved in either direction.

The parts are so proportioned and adjusted that when the sleeve 44 is pulled outwardly to its full extent by the knob 45, the head 15 on the platen-shaft will limit its motion and at that time the annular wedge-shaped end 46 will be just free of the downwardly-bent portions 49 and 50 of the springs 33 and 34.

At this point the springs are in normal position and not under tension of any kind.

By reference to Figure 1, it will be seen that the springs 33 and 34 lightly touch the annular sectional shoes 36 and 37 midsectionally which allows the drum 40 to rotate freely on the hollow shaft 23, or vice versa, thus disconnecting the platen from the line-space wheel to permit accurate positioning of the work before proceeding with the usual line-spacing.

After the work is positioned, the sleeve 44 is pushed toward the right by means of the hand-wheel 45, which forces the annular wedge 46 under the ends of the springs 49 and 50, forcing them outwardly. The bottoms of the slots 31 and 32 act as fulcrums for the ends of the flat springs 33 and 34, thus forcing outwardly the intermediate sections 35 which engage with the inner surface of the annular sectional shoes 36 and 37. As these shoes are very close to the inner surface of the drum 40 and are sufficient in cross section to be rigid, they will at once engage with this inner surface and, by continued pressure on the hand-wheel 45, the springs will be forced outwardly, thereby producing heavy tension on the springs 33 and 34 and binding the shoes 36 and 37 tightly to the inner surface of the drum 40 which is rigidly attached to the line-space wheel 43, compelling them to rotate therewith.

From this it will be seen that now the platen and line-space wheel are clutched together, because the pins 38 and 39 being fixed in the disk 26, which in turn is rigidly attached to the platen 14, prevent rotation of the shoes 36 and 37 except in unison therewith.

When it is desired to disconnect the platen from the line-space wheel, it is only necessary to withdraw the sleeve 44 by means of the hand-wheel 45 until the head 15 on the platen-shaft 13 strikes the bottom of the countersunk portion 44ᵃ. At that point the annular wedge 46 on the sleeve 44 is fully withdrawn from the ends 49 and 50 of the springs 33 and 34, allowing them to retract into normal position and freeing the annular sectional shoes 36 and 37 from the inner surface of the drum 40.

By reason of the pin 48 fastened to the hollow shaft 23 engaging in the slot 47 of the sleeve 44 to which is secured the hand-wheel 45, the platen 14 can be rotated at all times whether engaged to or disengaged from the line-space wheel 43.

The hand-wheel 22, being secured to the platen directly by reason of both being rigidly secured to the platen-shaft, will also rotate the platen at any time.

From this description it will be seen that the springs 33 and 34 are loosely confined in the longitudinal slots of the disks 26 and 28, and held in place by the loose annular sectional shoes 36 and 37, respectively, which in turn are held loosely in place by the drum 40 and kept from rotating in the channel where they rest by the pins 38 and 39.

It will be noticed that the clutch is made up of the least possible number of parts, each in its simplest form and loosely held together until the clutch-members are engaged when all are bound together efficiently for operation.

As the leverage of the springs 33 and 34 is very great and the only places that any wear occurs are at the ends 49 and 50 of the springs 33 and 34 and in the surface of the shoes 36 and 37, the efficiency of the clutch is not impaired thereby, thus giving it long life and economical operation, as well as being inexpensive to manufacture. A narrow and shallow annular groove 51 is cut near the end of the tubular shaft 23, and it is so positioned that it is just outside of the line-space wheel 43 after the parts are assembled.

A split collar 52 of spring metal and of an inside diameter equal to the diameter of the bottom of the groove 51 is sprung over the end 24 of the tubular shaft 23 and pushed backwardly until it snaps into the groove 51, thereby holding all the parts together. This collar 52 is made thin so as not to take up much room between the line-space wheel 43 and the bearing 25 in the carriage-frame 10.

It will also be observed that in case one of the springs 33 or 34 should break or become ineffective for any reason, the other will still operate and perform the functions of the two. It is also apparent that three or more springs and shoes may be equally spaced around the shaft 23, instead of two as shown.

Variations may be resorted to within the scope of the invention, and portions of the improvements may be used without others.

Having thus described my invention, I claim:

1. In a typewriter, the combination of a platen, an end support for said platen consisting of a sleeve with a circular flange, means rigidly securing said flange concentrically to said platen, springs loosely held longitudinally to said platen, fulcrums on said sleeve for the outer ends of said springs, a section of an annular ring resting at its central point on each of said springs, a line-space wheel with a drum rigidly attached and pivoted on said sleeve, and means to expand the springs at their inner ends to force said sections against the inner face of said drum and grip the same.

2. In a typewriter, the combination of a platen, a platen-shaft, a bearing on one end of said platen-shaft, a sleeve slidably mounted on the other end of the shaft, a cylindrical disk with a hollow stud centrally secured thereto, mounted concentrically on one end of said platen, a second disk secured on said stud spaced from said cylindrical disk, said disks having slots in longitudinal line, springs extending longitudinally of said platen and resting loosely in said slots, a cam-face on the end of said sleeve and located adjacent the ends of said springs, a line-space wheel with a drum attached thereto, and a section of an annulus resting centrally on each of said springs and in close proximity to the inner face of said drum, so that when the sleeve is pushed inwardly the drum will be engaged by each section of the annulus, locking the parts so that the platen and line-space wheel will rotate together.

3. In a typewriter, the combination of a platen, a platen-shaft, a line-space wheel, a drum attached to said line-space wheel, a hollow bearing for the platen at one end, springs mounted on said hollow bearing and extending in a longitudinal direction, arcuate shoes engaging said springs with their inner faces and loosely engaging the drum with their outer faces, and means for expanding said springs to force engagement of said shoes with said drum.

4. In a typewriting machine, the combination of a platen-frame, a platen, a platen-shaft, a bearing at one end for the platen-shaft, a tubular shaft for said platen at the opposite end, a flange attached to said tubular shaft to fix it on the platen, a bearing in the frame for said tubular shaft, a line-space wheel rotatable on said tubular shaft, a drum attached to said line-space wheel, said flange having radial slots, springs resting in the radial slots of said flange, semi-annular shoes resting on said springs with their inner faces and making loose contact with the inner face of the drum when the springs are not put under tension, and means slidable through said tubular bearing to put said springs under tension, thereby clutching the drum and wheel to the tubular shaft and platen.

5. In a typewriter, the combination of a platen, a platen-shaft, a line-space wheel and a clutch-member for connecting and disconnecting the platen and line-space wheel, consisting of a sleeve having a wedge-shaped end slidably mounted on said shaft, a second sleeve loosely fitting said first sleeve and having a circular flange secured to said platen, radial slots in said flange, longitudinally-placed springs in said slots, substantially semi-annular shoes engaging said springs, and a drum rigidly secured to said line-space wheel and in loose engagement with said shoes, all of which structure is so co-ordinated that sliding said first-mentioned sleeve inward over the platen-shaft the wedge-shaped end engages the ends of the springs, pushing them outward, exerting a pressure on the inside of each shoe, forcing it outward against the drum, thus clutching the parts together.

WILLIAM A. DOBSON.